US012802327B2

(12) United States Patent
Wang

(10) Patent No.: US 12,802,327 B2
(45) Date of Patent: Nov. 17, 2026

(54) EFFECT VIDEO GENERATING METHOD AND APPARATUS, DEVICE, AND STORAGE MEDIUM

(71) Applicant: Beijing Zitiao Network Technology Co., Ltd., Beijing (CN)

(72) Inventor: Jingye Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 119 days.

(21) Appl. No.: 18/848,114

(22) PCT Filed: Mar. 6, 2023

(86) PCT No.: PCT/CN2023/079811

§ 371 (c)(1),
(2) Date: Sep. 17, 2024

(87) PCT Pub. No.: WO2023/174087

PCT Pub. Date: Sep. 21, 2023

(65) Prior Publication Data

US 2025/0209714 A1 Jun. 26, 2025

(30) Foreign Application Priority Data

Mar. 18, 2022 (CN) ......................... 202210273163.1

(51) Int. Cl.
*G06T 5/90* (2024.01)
*G06T 13/40* (2011.01)
(Continued)

(52) U.S. Cl.
CPC .............. *G06T 13/60* (2013.01); *G06T 13/40* (2013.01); *G06T 15/005* (2013.01)

(58) Field of Classification Search
CPC ........ G06T 13/60; G06T 13/40; G06T 15/005
See application file for complete search history.

(56) References Cited

U.S. PATENT DOCUMENTS 12,131,408 B2 * 10/2024 Wu ......................... G06T 11/10
2021/0158603 A1 5/2021 Tumanov et al.
(Continued)

FOREIGN PATENT DOCUMENTS

CN 107436981 A 12/2017
CN 108182721 A 6/2018
(Continued)

OTHER PUBLICATIONS

China Patent Application No. 202210273163.1; Office Action; dated Feb. 28, 2025; 5 pages.
(Continued)

*Primary Examiner* — Cheng Yuan Tseng
(74) *Attorney, Agent, or Firm* — BakerHostetler

(57) ABSTRACT

The present disclosure provides an effect video generating method, an apparatus, a device and a storage medium. The effect video generating method includes: determining motion information of virtual fluid in a current frame and first state information of virtual fluid surface in a previous frame, the virtual fluid is placed in a virtual container; determining second state information of the virtual fluid surface in the current frame based on the motion information and the first state information, the second state information includes second fluid surface orientation information and second disturbance information; and rendering a fluid surface state of the current frame according to the second fluid surface orientation information and the second disturbance information to obtain a fluid motion effect map corresponding to the current frame.

20 Claims, 2 Drawing Sheets

(51) Int. Cl.
*G06T 13/60* (2011.01)
*G06T 15/00* (2011.01)

(56) References Cited

U.S. PATENT DOCUMENTS

| | | | | |
|---|---|---|---|---|
| 2023/0306672 | A1* | 9/2023 | Huang | G06T 15/005 |
| 2025/0209714 | A1* | 6/2025 | Wang | G06T 15/005 |

FOREIGN PATENT DOCUMENTS

| | | | | |
|---|---|---|---|---|
| CN | 108962392 | A | 12/2018 | |
| CN | 111459263 | A | 7/2020 | |
| CN | 112446941 | A | 3/2021 | |
| CN | 112598769 | A | 4/2021 | |
| CN | 112634420 | A | 4/2021 | |
| CN | 114663553 | A | 6/2022 | |
| CN | 115294254 | A * | 11/2022 | H04N 5/262 |
| WO | WO 2019/196133 | A1 | 10/2019 | |
| WO | WO 2022/022029 | A1 | 2/2022 | |

OTHER PUBLICATIONS

International Patent Application No. PCT/CN2023/079811; Int'l Search Report; dated May 23, 2023; 3 pages.

China Patent Application No. 202210273163.1; Office Action; dated Sep. 18, 2024; 16 pages.

Zhang et al.; "Review on Fluid Animation Generation"; Journal of Integration Technology; vol. 6 No. 1; Jan. 2017; p. 69-81 (*contains English Abstract*).

* cited by examiner

EFFECT VIDEO GENERATING METHOD AND APPARATUS, DEVICE, AND STORAGE MEDIUM

The present application is a national phase application of International Patent Application No. PCT/CN2023/079811, filed on Mar. 6, 2023, which claims priority of the Chinese Patent Application No. 202210273163.1, filed on Mar. 18, 2022, the disclosure of which is incorporated herein by reference in its entirety.

TECHNICAL FIELD

The present disclosure relates to the technical field of image effect processing, such as an effect video generating method and apparatus, a device, and a storage medium.

BACKGROUND

Most of simulation algorithms for fluid objects (referred to as fluid) are implemented based on Position Base Dynamic (PBD) algorithm. The principle is to abstract the fluid into multiple particles and calculate motion states of the particles in each frame, so as to generate a fluid motion effect video. However, this algorithm has a large budget and cannot generate the fluid motion effect video in real time.

SUMMARY

The method, the apparatus, the device, and the storage medium for generate the effect video provided by the present disclosure can reduce calculation amount for simulating fluid motion, thereby improving the efficiency of generating the fluid motion effect video.

In a first aspect, the present disclosure provides an effect video generating method, which includes:

- determining motion information of virtual fluid in a current frame and first state information of virtual fluid surface in a previous frame, the virtual fluid is placed in a virtual container;
- determining second state information of the virtual fluid surface in the current frame based on the motion information and the first state information, the second state information includes second fluid surface orientation information and second disturbance information; and
- rendering a fluid surface state of the current frame according to the second fluid surface orientation information and the second disturbance information to obtain a fluid motion effect map corresponding to the current frame.

In a second aspect, the present disclosure further provides an effect video generating apparatus, which includes:

- a motion information determining module, configured to determine motion information of virtual fluid in a current frame and first state information of virtual fluid surface in a previous frame, the virtual fluid is placed in a virtual container;
- a second state information determining module, configured to determine second state information of the virtual fluid surface in the current frame based on the motion information and the first state information, the second state information includes second fluid surface orientation information and second disturbance information; and
- a fluid motion effect map acquisition module, configured to render a fluid surface state of the current frame according to the second fluid surface orientation information and the second disturbance information to obtain a fluid motion effect map corresponding to the current frame.

In a third aspect, the present disclosure further provides an electronic device, which includes:

- at least one processing apparatus; and
- a storage apparatus, configured to store at least one program;
- the at least one program, when executed by the at least one processing apparatus,
- causes the at least one processing apparatus to implement the above-mentioned effect video generating method.

In a fourth aspect, the present disclosure further provides a computer-readable medium, on which computer programs are stored, the computer programs, when executed by a processing apparatus, implement the above-mentioned effect video generating method.

In a fifth aspect, the present disclosure further provides a computer program product, including computer programs carried on a non-transitory computer-readable medium, the computer programs include program code for executing the above-mentioned effect video generating method.

DETAILED DESCRIPTION

Figure 1:
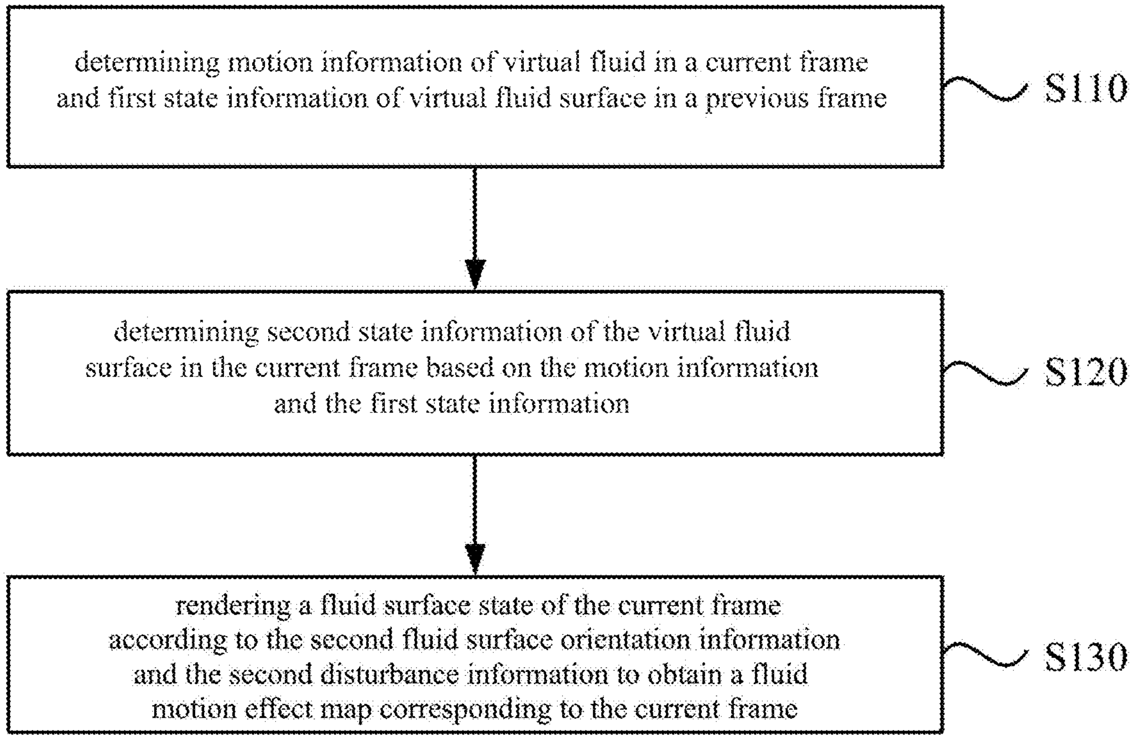
FIG. 1 is a flowchart of an effect video generating method provided by embodiments of the present disclosure.

Embodiments of the present disclosure will be described below with reference to the accompanying drawings. Although some embodiments of the present disclosure are shown in the drawings, the present disclosure can be embodied in various forms, and these embodiments are provided for understanding the present disclosure. The drawings and embodiments of the present disclosure are for exemplary purposes only.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

Concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and those skilled in the art should understand that unless otherwise explicitly stated in the context, it should be understood as "one or more".

Names of messages or information exchanged among multiple apparatus in the embodiments of the present disclosure are only used for illustrative purposes, and are not used to limit the scope of these messages or information.

FIG. 1 is a flowchart of an effect video generating method provided by embodiments of the present disclosure. The embodiment may be applied to the situation of simulating a motion state of a virtual fluid, and the method may be executed by an effect video generating apparatus, which may be composed of hardware and/or software, and can generally be integrated in device with an effect image generating function, which may be an electronic device such as a server, a mobile terminal or a server cluster, etc. As shown in FIG. 1, the method includes the following steps:

S110: determining motion information of virtual fluid in a current frame and first state information of virtual fluid surface in a previous frame.

The virtual fluid is placed in a virtual container. The motion information in the current frame may include a motion speed and acceleration. The first state information in the previous frame may include first disturbance information, first fluid surface orientation information, a first fluid surface motion speed and a first swing amplitude. The first disturbance information may be the information of waves generated by the disturbance added to the fluid surface in the previous frame; The first fluid surface orientation information may be characterized by the normal information (such as normal vector) of the fluid surface in the previous frame.

The ways to determine the motion information of the virtual fluid in the current frame may be as follows: determining motion information of a mobile terminal in the current frame as the motion information of the virtual fluid in the current frame; or identifying limbs of a character in a picture, and determining motion information of the limbs of the character in the current frame as the motion information of the virtual fluid in the current frame.

In the embodiment, when a user turns on a camera in a terminal device, a virtual container (such as a transparent virtual water cup or a transparent virtual fish tank, etc.) is generated in a current picture, and a virtual fluid (such as water, milk or colored drinks, etc.) is generated in the virtual container. When the user swings the mobile terminal, the virtual container and the virtual fluid move with the swinging mobile terminal, or limbs of a character (such as head, legs, body or arms, etc.) are detected in the picture; and when the limbs of the character move, the virtual container and the virtual fluid move with the motion of the limbs of the character. In the embodiment, the motion state of the virtual fluid in the virtual container is simulated, so that the virtual fluid moves with the motion of the container like the real fluid.

The ways to determine the motion information of the virtual fluid in the current frame may be as follows: acquiring first position information of the virtual fluid in the current frame and second position information in the previous frame; determining the motion speed of the virtual fluid in the current frame according to the first position information and the second position information; acquiring a motion speed of the virtual fluid in the previous frame; and determining the acceleration of the virtual fluid in the current frame according to the motion speed of the virtual fluid in the current frame and the motion speed in the previous frame.

In the embodiment, the virtual fluid moves with the virtual container, and the position information of the virtual fluid may be determined by the position information of a center point of the virtual container. If the motion information of the mobile terminal in the current frame is determined as the motion information of the virtual fluid in the current frame, the virtual container moves with the mobile terminal, so the position information of the virtual container may be determined by acquiring the position information of any point of the mobile terminal. If the motion information of the limbs of the character in the current frame is determined as the motion information of the virtual fluid in the current frame, the virtual container moves with the motion of the limbs of the character, so the position information of the virtual container may be determined by acquiring the position information of any key point of the limbs of the character. Assuming that the three-dimensional position coordinates of the center point of the virtual container in the current frame are $P_t$, and the three-dimensional position coordinates of the center point of the virtual container in the previous frame are $P_{t-1}$, the motion speed of the virtual fluid in the current frame is $u_t=P_t-P_{t-1}$, and the acceleration is $d_t=u_t-u_{t-1}$. A plurality of parameters appearing in the embodiment are all three-dimensional parameters, and the following description will not be repeated.

S120: determining second state information of the virtual fluid surface in the current frame based on the motion information and the first state information.

The second state information includes second fluid surface orientation information and second disturbance information. The second disturbance information may be the information of waves generated by the disturbance added to the fluid surface in the current frame; and the second fluid surface orientation information may be characterized by the normal information (such as normal vector) of the fluid surface in the current frame.

The process of determining the second state information of the virtual fluid surface in the current frame based on the motion information and the first state information may be as follows: determining a second swing amplitude and initial fluid surface orientation information of the virtual fluid surface in the current frame according to the motion information and the first state information; determining the second fluid surface orientation information based on the second swing amplitude and the initial fluid surface orientation information; and determining the second disturbance information based on the second swing amplitude and the first disturbance information.

The initial fluid surface orientation information may be an initial normal vector of the fluid surface of the current frame.

In the embodiment, the process of determining the initial fluid surface orientation information of the virtual fluid surface in the current frame according to the motion information and the first state information may be as follows: determining a second fluid surface motion speed according to the acceleration and the first fluid surface motion speed; acquiring a set rotation matrix corresponding to a set Euler angle; and determining the initial fluid surface orientation information according to the set rotation matrix and the second fluid surface motion speed.

the process of determining the second fluid surface motion speed according to the acceleration and the first fluid surface motion speed may be calculated according to the following formula: $v_t=0.6\cdot v_{t-1}-0.4\cdot d_{t-1}$. The set Euler angle may be (0, 180°, 0), and the set rotation matrix corresponding to the set Euler angle may be a four-element rotation matrix rotating around the set Euler angle. The set rotation matrix may be expressed as $Q_u$, and the process of determining the initial fluid surface orientation information according to the set rotation matrix and the second fluid surface motion speed may be calculated according to the following formula: $N_t=Q_u\cdot(-0.5\cdot v_t+0.5n)$, where n is a gravity vector (0,1,0).

The ways to determine the second swing amplitude of the virtual fluid surface in the current frame according to the motion information and the first state information may be as follows: determining a first angular velocity of the virtual fluid surface in the previous frame; and determining the second swing amplitude based on the first angular velocity, the first swing amplitude, the motion speed and the first fluid surface orientation information.

The formula for determining the second swing amplitude based on the first angular velocity, the first swing amplitude, the motion speed and the first fluid surface orientation information may be expressed as: $m_t=0.02\ (m_{t-1.x}+0.05\cdot N_{t-1.x}+A_{t-1.z},\ m_{t-1.y}+0.002\cdot u_{t.y},\ m_{t-1.z}+0.05\cdot N_{t-1.z}+A_{t-1.x})$, where $m_t$ is the second swing amplitude in the current frame, $m_{t-1.x}$, $m_{t-1.y}$, $m_{t-1.z}$ is the x-direction component, the y-direction component and the z-direction component of the second swing amplitude, respectively, $N_{t-1.x}$, $N_{t-1.z}$ are the x-direction component and the z-direction component of the first fluid surface orientation information, respectively, and $A_{t-1.x}$, $A_{t-1.z}$: are the x-direction component and z-direction component of the first angular velocity, respectively.

The way to determine a second angular velocity of the virtual fluid surface in the current frame may be as follows: acquiring a first rotation matrix of the virtual fluid in the previous frame and a second rotation matrix in the current frame; determining rotation axis information according to the first rotation matrix and the second rotation matrix, and acquiring the first angular velocity of the virtual fluid surface in the previous frame; and determining the second angular velocity according to the first angular velocity and the rotation axis information.

Both the first rotation matrix and the second rotation matrix may be obtained by an attitude sensor (such as a gyro sensor) installed in the mobile terminal. The process of determining the rotation axis information according to the first rotation matrix and the second rotation matrix may be: converting a matrix multiplied by the second rotation matrix and the first rotation matrix to obtain the rotation axis information. Assuming that the second rotation matrix is expressed as $Q_t$, the first rotation matrix is expressed as $Q_{t-1}$, and the rotation axis $c_t$ is obtained by transforming the $Q_t\cdot Q_{t-1}$. Then the formula for determining the second angular velocity according to the first angular velocity and the rotation axis information may be: $A_t=Q_u\cdot(0.5\cdot(0.9\cdot A_{t-1}+0.09\cdot A_{t-1}c_t)-0.5\cdot n)$, where n is the gravity vector. Similarly, the first angular velocity of the virtual fluid surface in the previous frame can also be calculated according to the above formula.

In the embodiment, in order to simulate the real fluid motion state, it is necessary to consider the swing amplitude of the fluid surface. The ways to determine the second fluid surface orientation information based on the second swing amplitude and the initial fluid surface orientation information may be as follows: determining a disturbance angle according to the initial fluid surface orientation information and the gravity vector; determining a disturbance vector based on the disturbance angle and a volume of the virtual container; and determining the second fluid surface orientation information according to the disturbance vector, the second swing amplitude and the initial fluid surface orientation information.

The calculation formula of the disturbance angle may be:

$$\beta = 0.9\cdot\arccos\left(\frac{|N_t\cdot n|}{|N_t|\cdot|n|}\right),$$

where $N_t$ is the initial fluid surface orientation information and n is the gravity vector. The calculation formula of the disturbance vector may be expressed as:

$$s_t = \left(\sin\left(\frac{1.5\cdot t}{V}\right),\ (1-0.9\cdot\beta)\cdot\sin\left(\frac{t}{V}\right)\right),$$

where V is the volume of the virtual container, t is the timestamp of the current frame, and β is the disturbance angle. The calculation formula for determining the second fluid surface orientation information according to the disturbance vector, the second swing amplitude and the initial fluid surface orientation information is: $w_t=\Gamma(m_{t.x}*s_{t.x}+0.25\cdot N_{t.x},\ 1.0,\ m_{t.z}*s_{t.y}+0.25\cdot N_{t.z})$, where $\Gamma(\ )$ represents normalizing the vector, $m_{t.x}$, $m_{t.z}$ represent the x-direction component and the z-direction component of the second swing amplitude, respectively, $N_{t.x}$, $N_{t.z}$ represent the x-direction component and the z-direction component of the initial fluid surface orientation information, respectively, and $s_{t.x}$, $s_{t.y}$ represent the x-direction component and the y-direction component of the disturbance vector, respectively.

The calculation formula for determining the second disturbance information based on the second swing amplitude and the first disturbance information may be: $h_t=0.2\ h_{t-1}+0.8\cdot(0.5\cdot\sqrt{5\cdot|m_t|}+0.5)^{7.5}$, where $h_t$ is the second disturbance information in the current frame, $h_{t-1}$ is the first disturbance information in the previous frame.

S130: rendering a fluid surface state of the current frame according to the second fluid surface orientation information and the second disturbance information to obtain a fluid motion effect map corresponding to the current frame.

After acquiring the second fluid surface orientation information $w_t$ and the second disturbance information $h_t$ of the current frame, the $w_t$ and $h_t$ are transmitted to the rendering shader to obtain the fluid motion effect map corresponding to the current frame.

The process of rendering the fluid surface state of the current frame according to the second fluid surface orientation information and the second disturbance information to obtain the fluid motion effect map corresponding to the current frame may be as follows: determining an initial fluid surface state according to the second fluid surface orientation information; superposing the second disturbance information on the initial fluid surface state to obtain a target fluid surface state; and rendering the target fluid surface state to obtain a fluid motion effect image corresponding to the current frame.

Figure 2:
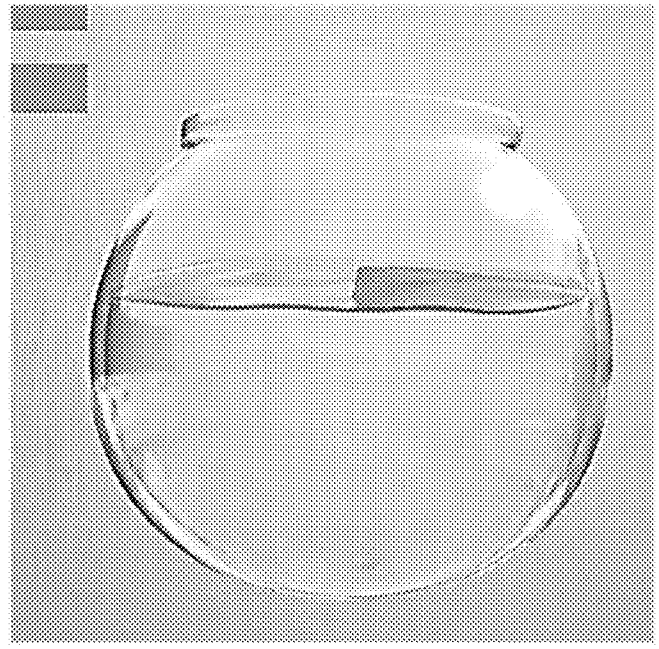
FIG. 2 is an example diagram of a water motion effect image provided by embodiments of the present disclosure.

The second fluid surface orientation information is represented by a normal vector, which is perpendicular to the fluid surface, so the plane function corresponding to the initial fluid surface state may be obtained according to the normal vector. The way to superpose the second disturbance information on the initial fluid surface state may be as follows: inputting the second disturbance information into a set noise function to obtain a noise function carrying the second disturbance information, and linearly superimposing the noise function with a plane function corresponding to the initial surface state to obtain a state function corresponding to the target fluid surface state. Finally, the target fluid surface state is rendered based on the state function, and the fluid motion effect image corresponding to the current frame is obtained. For example, FIG. 2 is an example diagram of an effect image of water motion provided by embodiments of the present disclosure, and as shown in FIG. 2, it shows the motion state of the water surface in this frame.

The technical scheme of the embodiment of the present disclosure, which includes: determining motion information of virtual fluid in a current frame and first state information of virtual fluid surface in a previous frame, the virtual fluid is placed in a virtual container; determining second state information of the virtual fluid surface in the current frame based on the motion information and the first state information, the second state information includes second fluid surface orientation information and second disturbance information; and rendering a fluid surface state of the current frame according to the second fluid surface orientation information and the second disturbance information to obtain a fluid motion effect map corresponding to the current frame. According to the embodiment of the present disclosure, the fluid surface state is rendered through the second fluid surface orientation information and the second disturbance information of the current frame, and the fluid motion effect map corresponding to the current frame is obtained, so that the calculation amount for simulating the fluid motion can be reduced, and the efficiency of generating the fluid motion effect video can be improved.

Figure 3:
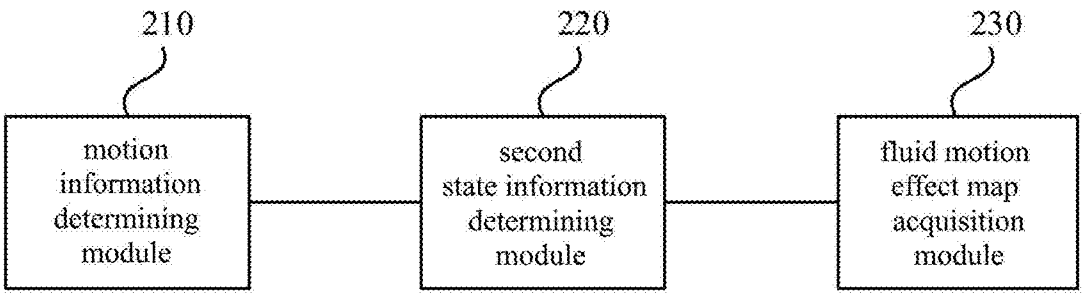
FIG. 3 is a schematic structural diagram of an effect video generating apparatus provided by embodiments of the present disclosure.

FIG. 3 is a schematic structural diagram of an effect video generating apparatus provided by embodiments of the present disclosure. As shown in FIG. 3, the apparatus includes:

a motion information determining module 210, configured to determine motion information of virtual fluid in a current frame and first state information of virtual fluid surface in a previous frame, the virtual fluid is placed in a virtual container; a second state information determining module 220, configured to determine second state information of the virtual fluid surface in the current frame based on the motion information and the first state information, the second state information includes second fluid surface orientation information and second disturbance information; and a fluid motion effect map acquisition module 230, configured to render a fluid surface state of the current frame according to the second fluid surface orientation information and the second disturbance information to obtain a fluid motion effect map corresponding to the current frame.

In an embodiment, the motion information includes a motion speed and acceleration, and the first state information includes first disturbance information, first fluid surface orientation information, a first fluid surface motion speed and a first swing amplitude.

In an embodiment, the motion information determining module 210 is further configured to:

determining motion information of a mobile terminal in the current frame as the motion information of the virtual fluid in the current frame; or identifying limbs of a character in a picture, and determining motion information of the limbs of the character in the current frame as the motion information of the virtual fluid in the current frame.

In an embodiment, the motion information determining module 210 is further configured to:

acquiring first position information of the virtual fluid in the current frame and second position information in the previous frame; determining the motion speed of the virtual fluid in the current frame according to the first position information and the second position information; acquiring a motion speed of the virtual fluid in the previous frame; and determining the acceleration of the virtual fluid in the current frame according to the motion speed of the virtual fluid in the current frame and the motion speed in the previous frame.

In an embodiment, the second state information determining module 220 is further configured to:

determining a second swing amplitude and initial fluid surface orientation information of the virtual fluid surface in the current frame according to the motion information and the first state information; determining the second fluid surface orientation information based on the second swing amplitude and the initial fluid surface orientation information; and determining the second disturbance information based on the second swing amplitude and the first disturbance information.

In an embodiment, the second state information determining module 220 is further configured to:

determining a first angular velocity of the virtual fluid surface in the previous frame; and determining the second swing amplitude based on the first angular velocity, the first swing amplitude, the motion speed and the first fluid surface orientation information.

In an embodiment, the second state information determining module 220 is further configured to:

acquiring a first rotation matrix of the virtual fluid in the previous frame and a second rotation matrix in the current frame; determining rotation axis information according to the first rotation matrix and the second rotation matrix, and acquiring the first angular velocity of the virtual fluid surface in the previous frame; and determining the second angular velocity according to the first angular velocity and the rotation axis information.

In an embodiment, the second state information determining module 220 is further configured to:

determining a second fluid surface motion speed according to the acceleration and the first fluid surface motion speed; acquiring a set rotation matrix corresponding to a set Euler angle; and determining the initial fluid surface orientation information according to the set rotation matrix and the second fluid surface motion speed.

In an embodiment, the second state information determining module 220 is further configured to:

determining a disturbance angle according to the initial fluid surface orientation information and a gravity vector; determining a disturbance vector based on the disturbance angle and a volume of the virtual container; and determining the second fluid surface orientation information according to the disturbance vector, the second swing amplitude and the initial fluid surface orientation information.

In an embodiment, the fluid motion effect map acquisition module 230 is further configured to:

determining an initial fluid surface state according to the second fluid surface orientation information; superposing the second disturbance information on the initial fluid surface state to obtain a target fluid surface state;

rendering the target fluid surface state to obtain a fluid motion effect image corresponding to the current frame.

The above-mentioned apparatus can execute the methods provided by all the above-mentioned embodiments of the present disclosure, and has corresponding functional modules and effects for executing the above-mentioned methods. For technical details that are not described in detail in the embodiments, the methods provided by all the previous embodiments of the present disclosure may be referred to.

Figure 4:
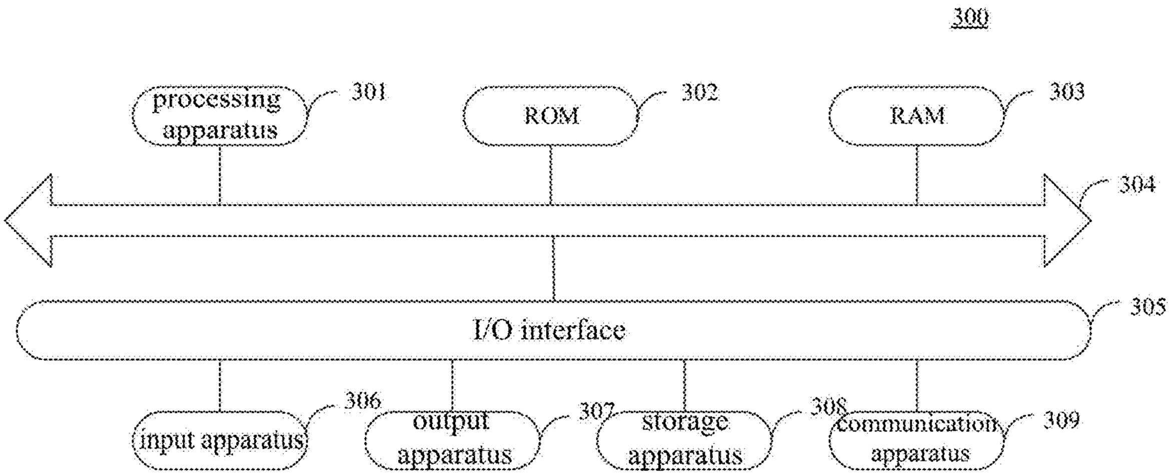
FIG. 4 is a schematic structural diagram of an electronic device provided by embodiments of the present disclosure.

Referring to FIG. 4, FIG. 4 illustrates a schematic structural diagram of an electronic device 300 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 4 is merely an example, and should not pose any limitation to the functions and the range of use of the embodiments of the present disclosure.

As illustrated in FIG. 4, the electronic device 300 may include a processing apparatus 301 (e.g., a central processing unit, a graphics processing unit, etc.), which can perform various suitable actions and processing according to a program stored in a read-only memory (ROM) 302 or a program loaded from a storage apparatus 308 into a random-access memory (RAM) 303. The RAM 303 further stores various programs and data required for operations of the electronic device 300. The processing apparatus 301, the ROM 302, and the RAM 303 are interconnected by means of a bus 304. An input/output (I/O) interface 305 is also connected to the bus 304.

Usually, the following apparatus may be connected to the I/O interface 305: an input apparatus 306 including, for example, a touch screen, a touch pad, a keyboard, a mouse, a camera, a microphone, an accelerometer, a gyroscope, or the like; an output apparatus 307 including, for example, a liquid crystal display (LCD), a loudspeaker, a vibrator, or the like; a storage apparatus 308 including, for example, a magnetic tape, a hard disk, or the like; and a communication apparatus 309. The communication apparatus 309 may allow the electronic device 300 to be in wireless or wired communication with other devices to exchange data. While FIG. 4 illustrates the electronic device 300 having various apparatuses, it should be understood that not all of the illustrated apparatuses are necessarily implemented or included. More or fewer apparatuses may be implemented or included alternatively.

According to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 309 and installed, or may be installed from the storage apparatus 308, or may be installed from the ROM 302. When the computer program is executed by the processing apparatus 301, the above-mentioned functions defined in the methods of some embodiments of the present disclosure are performed.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: determine motion information of virtual fluid in a current frame and first state information of virtual fluid surface in a previous frame, the virtual fluid is placed in a virtual container; determine second state information of the virtual fluid surface in the current frame based on the motion information and the first state information, the second state information includes second fluid surface orientation information and second disturbance information; and render a fluid surface state of the current frame according to the second fluid surface orientation information and the second disturbance information to obtain a fluid motion effect map corresponding to the current frame.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the embodiments of the present disclosure discloses an effect video generating method, which includes the following steps:

determining motion information of virtual fluid in a current frame and first state information of virtual fluid surface in a previous frame, the virtual fluid is placed in a virtual container;

determining second state information of the virtual fluid surface in the current frame based on the motion information and the first state information, the second state information includes second fluid surface orientation information and second disturbance information; and rendering a fluid surface state of the current frame according to the second fluid surface orientation information and the second disturbance information to obtain a fluid motion effect map corresponding to the current frame.

According to one or more embodiments of the present disclosure, the motion information includes a motion speed and acceleration, and the first state information includes first disturbance information, first fluid surface orientation information, a first fluid surface motion speed and a first swing amplitude.

According to one or more embodiments of the present disclosure, determining the motion information of the virtual fluid in the current frame includes:

determining motion information of a mobile terminal in the current frame as the motion information of the virtual fluid in the current frame; or identifying limbs of a character in a picture, and determining motion information of the limbs of the character in the current frame as the motion information of the virtual fluid in the current frame.

According to one or more embodiments of the present disclosure, determining the motion information of the virtual fluid in the current frame includes:

acquiring first position information of the virtual fluid in the current frame and second position information in the previous frame;

determining the motion speed of the virtual fluid in the current frame according to the first position information and the second position information;

acquiring a motion speed of the virtual fluid in the previous frame; and determining the acceleration of the virtual fluid in the current frame according to the motion speed of the virtual fluid in the current frame and the motion speed in the previous frame.

According to one or more embodiments of the present disclosure, determining the second state information of the virtual fluid surface in the current frame based on the motion information and the first state information includes:

determining a second swing amplitude and initial fluid surface orientation information of the virtual fluid surface in the current frame according to the motion information and the first state information;

determining the second fluid surface orientation information based on the second swing amplitude and the initial fluid surface orientation information; and determining the second disturbance information based on the second swing amplitude and the first disturbance information.

According to one or more embodiments of the present disclosure, determining the second swing amplitude of the virtual fluid surface in the current frame according to the motion information and the first state information includes:

determining a first angular velocity of the virtual fluid surface in the previous frame; and determining the second swing amplitude based on the first angular velocity, the first swing amplitude, the motion speed and the first fluid surface orientation information.

According to one or more embodiments of the present disclosure, determining a second angular velocity of the virtual fluid surface in the current frame includes:

acquiring a first rotation matrix of the virtual fluid in the previous frame and a second rotation matrix in the current frame;

determining rotation axis information according to the first rotation matrix and the second rotation matrix, and acquiring the first angular velocity of the virtual fluid surface in the previous frame; and determining the second angular velocity according to the first angular velocity and the rotation axis information.

According to one or more embodiments of the present disclosure, determining the initial fluid surface orientation information of the virtual fluid surface in the current frame according to the motion information and the first state information includes:

determining a second fluid surface motion speed according to the acceleration and the first fluid surface motion speed;

acquiring a set rotation matrix corresponding to a set Euler angle; and determining the initial fluid surface orientation information according to the set rotation matrix and the second fluid surface motion speed.

According to one or more embodiments of the present disclosure, determining the second fluid surface orientation information based on the second swing amplitude and the initial fluid surface orientation information includes:

determining a disturbance angle according to the initial fluid surface orientation information and a gravity vector;

determining a disturbance vector based on the disturbance angle and a volume of the virtual container; and determining the second fluid surface orientation information according to the disturbance vector, the second swing amplitude and the initial fluid surface orientation information.

According to one or more embodiments of the present disclosure, rendering the fluid surface state of the current frame according to the second fluid surface orientation information and the second disturbance information to obtain the fluid motion effect map corresponding to the current frame includes:

determining an initial fluid surface state according to the second fluid surface orientation information;

superposing the second disturbance information on the initial fluid surface state to obtain a target fluid surface state; and rendering the target fluid surface state to obtain a fluid motion effect image corresponding to the current frame.

The invention claimed is:

1. An effect video generating method, comprising:

determining motion information of virtual fluid in a current frame and first state information of virtual fluid surface in a previous frame, wherein the virtual fluid is placed in a virtual container, wherein determining the motion information of the virtual fluid in the current frame comprises:

acquiring first position information of the virtual fluid in the current frame and second position information in the previous frame, determining a motion speed of the virtual fluid in the current frame according to the first position information and the second position information, acquiring a motion speed of the virtual fluid in the previous frame, and determining an acceleration of the virtual fluid in the current frame according to the motion speed of the virtual fluid in the current frame and the motion speed in the previous frame;

determining second state information of the virtual fluid surface in the current frame based on the motion information and the first state information, wherein the second state information comprises second fluid surface orientation information and second disturbance information; and rendering a fluid surface state of the current frame according to the second fluid surface orientation information and the second disturbance information to obtain a fluid motion effect map corresponding to the current frame.

2. The method according to claim 1, wherein the motion information comprises the motion speed and the acceleration, and the first state information comprises first disturbance information, first fluid surface orientation information, a first fluid surface motion speed and a first swing amplitude.

3. The method according to claim 1, wherein determining the motion information of the virtual fluid in the current frame comprises:

determining motion information of a mobile terminal in the current frame as the motion information of the virtual fluid in the current frame; or identifying limbs of a character in a picture, and determining motion information of the limbs of the character in the current frame as the motion information of the virtual fluid in the current frame.

4. The method according to claim 1, wherein determining the second state information of the virtual fluid surface in the current frame based on the motion information and the first state information comprises:

determining a second swing amplitude and initial fluid surface orientation information of the virtual fluid surface in the current frame according to the motion information and the first state information;

determining the second fluid surface orientation information based on the second swing amplitude and the initial fluid surface orientation information; and determining the second disturbance information based on the second swing amplitude and first disturbance information comprised in the first state information.

5. The method according to claim 4, wherein determining the second swing amplitude of the virtual fluid surface in the current frame according to the motion information and the first state information comprises:

determining a first angular velocity of the virtual fluid surface in the previous frame; and determining the second swing amplitude based on the first angular velocity, the first swing amplitude, the motion speed and the first fluid surface orientation information.

6. The method according to claim 5, further comprising:

determining a second angular velocity of the virtual fluid surface in the current frame;

wherein determining the second angular velocity of the virtual fluid surface in the current frame comprises:

acquiring a first rotation matrix of the virtual fluid in the previous frame and a second rotation matrix in the current frame;

determining rotation axis information according to the first rotation matrix and the second rotation matrix, and acquiring the first angular velocity of the virtual fluid surface in the previous frame; and determining the second angular velocity according to the first angular velocity and the rotation axis information.

7. The method according to claim 4, wherein determining the initial fluid surface orientation information of the virtual fluid surface in the current frame according to the motion information and the first state information comprises:

determining a second fluid surface motion speed according to the acceleration and the first fluid surface motion speed;

acquiring a set rotation matrix corresponding to a set Euler angle; and determining the initial fluid surface orientation information according to the set rotation matrix and the second fluid surface motion speed.

8. The method of claim 4, wherein determining the second fluid surface orientation information based on the second swing amplitude and the initial fluid surface orientation information comprises:

determining a disturbance angle according to the initial fluid surface orientation information and a gravity vector;

determining a disturbance vector based on the disturbance angle and a volume of the virtual container; and determining the second fluid surface orientation information according to the disturbance vector, the second swing amplitude and the initial fluid surface orientation information.

9. The method according to claim 1, wherein rendering the fluid surface state of the current frame according to the second fluid surface orientation information and the second disturbance information to obtain the fluid motion effect map corresponding to the current frame comprises:

determining an initial fluid surface state according to the second fluid surface orientation information;

superposing the second disturbance information on the initial fluid surface state to obtain a target fluid surface state; and rendering the target fluid surface state to obtain a fluid motion effect image corresponding to the current frame.

10. An electronic device comprising:

at least one processing apparatus; and a storage apparatus, configured to store at least one program;

wherein the at least one program, when executed by the at least one processing apparatus, causes the at least one processing apparatus to implement operations comprising:

determining motion information of virtual fluid in a current frame and first state information of virtual fluid surface in a previous frame, wherein the virtual fluid is placed in a virtual container, wherein determining the motion information of the virtual fluid in the current frame comprises:

acquiring first position information of the virtual fluid in the current frame and second position information in the previous frame, determining a motion speed of the virtual fluid in the current frame according to the first position information and the second position information, acquiring a motion speed of the virtual fluid in the previous frame, and determining an acceleration of the virtual fluid in the current frame according to the motion speed of the virtual fluid in the current frame and the motion speed in the previous frame;

determining second state information of the virtual fluid surface in the current frame based on the motion information and the first state information, wherein the second state information comprises second fluid surface orientation information and second disturbance information; and rendering a fluid surface state of the current frame according to the second fluid surface orientation information and the second disturbance information to obtain a fluid motion effect map corresponding to the current frame.

11. A non-transitory computer-readable storage medium, on which computer programs are stored, wherein the computer programs, when executed by a processing apparatus, implement operations comprising:

determining motion information of virtual fluid in a current frame and first state information of virtual fluid surface in a previous frame, wherein the virtual fluid is placed in a virtual container, wherein determining the motion information of the virtual fluid in the current frame comprises:

acquiring first position information of the virtual fluid in the current frame and second position information in the previous frame, determining a motion speed of the virtual fluid in the current frame according to the first position information and the second position information, acquiring a motion speed of the virtual fluid in the previous frame, and determining an acceleration of the virtual fluid in the current frame according to the motion speed of the virtual fluid in the current frame and the motion speed in the previous frame;

determining second state information of the virtual fluid surface in the current frame based on the motion information and the first state information, wherein the second state information comprises second fluid surface orientation information and second disturbance information; and rendering a fluid surface state of the current frame according to the second fluid surface orientation information and the second disturbance information to obtain a fluid motion effect map corresponding to the current frame.

12. The electronic device according to claim 10, wherein the motion information comprises the motion speed and the acceleration, and the first state information comprises first disturbance information, first fluid surface orientation information, a first fluid surface motion speed and a first swing amplitude.

13. The electronic device according to claim 10, wherein determining the motion information of the virtual fluid in the current frame comprises:

determining motion information of a mobile terminal in the current frame as the motion information of the virtual fluid in the current frame; or identifying limbs of a character in a picture, and determining motion information of the limbs of the character in the current frame as the motion information of the virtual fluid in the current frame.

14. The electronic device according to claim 10, wherein determining the second state information of the virtual fluid surface in the current frame based on the motion information and the first state information comprises:

determining a second swing amplitude and initial fluid surface orientation information of the virtual fluid surface in the current frame according to the motion information and the first state information;

determining the second fluid surface orientation information based on the second swing amplitude and the initial fluid surface orientation information; and determining the second disturbance information based on the second swing amplitude and first disturbance information comprised in the first state information.

15. The electronic device according to claim 14, wherein determining the second swing amplitude of the virtual fluid surface in the current frame according to the motion information and the first state information comprises:

determining a first angular velocity of the virtual fluid surface in the previous frame; and determining the second swing amplitude based on the first angular velocity, the first swing amplitude, the motion speed and the first fluid surface orientation information.

16. The electronic device according to claim 14, wherein determining the initial fluid surface orientation information of the virtual fluid surface in the current frame according to the motion information and the first state information comprises:

determining a second fluid surface motion speed according to the acceleration and the first fluid surface motion speed;

acquiring a set rotation matrix corresponding to a set Euler angle; and determining the initial fluid surface orientation information according to the set rotation matrix and the second fluid surface motion speed.

17. The electronic device according to claim 14, wherein determining the second fluid surface orientation information based on the second swing amplitude and the initial fluid surface orientation information comprises:

determining a disturbance angle according to the initial fluid surface orientation information and a gravity vector;

determining a disturbance vector based on the disturbance angle and a volume of the virtual container; and determining the second fluid surface orientation information according to the disturbance vector, the second swing amplitude and the initial fluid surface orientation information.

18. The electronic device according to claim 10, wherein rendering the fluid surface state of the current frame according to the second fluid surface orientation information and the second disturbance information to obtain the fluid motion effect map corresponding to the current frame comprises:

determining an initial fluid surface state according to the second fluid surface orientation information;

superposing the second disturbance information on the initial fluid surface state to obtain a target fluid surface state; and rendering the target fluid surface state to obtain a fluid motion effect image corresponding to the current frame.

19. The non-transitory computer-readable storage medium according to claim 11, wherein determining the second state information of the virtual fluid surface in the current frame based on the motion information and the first state information comprises:

determining a second swing amplitude and initial fluid surface orientation information of the virtual fluid surface in the current frame according to the motion information and the first state information;

determining the second fluid surface orientation information based on the second swing amplitude and the initial fluid surface orientation information; and determining the second disturbance information based on the second swing amplitude and first disturbance information comprised in the first state information.

20. The non-transitory computer-readable storage medium according to claim 11, wherein rendering the fluid surface state of the current frame according to the second fluid surface orientation information and the second disturbance information to obtain the fluid motion effect map corresponding to the current frame comprises:

determining an initial fluid surface state according to the second fluid surface orientation information;

superposing the second disturbance information on the initial fluid surface state to obtain a target fluid surface state; and rendering the target fluid surface state to obtain a fluid motion effect image corresponding to the current frame.

* * * * *